United States

Rush et al.

3,711,202

Jan. 16, 1973

[54] HOLOGRAPHIC TESTING APPARATUS

[75] Inventors: Hugh M. Rush, Coronado; Milan E. Gerard, Chula Vista, both of Calif.

[73] Assignee: Rohr Corporation, Chula Vista, Calif.

[22] Filed: Dec. 8, 1969

[21] Appl. No.: 883,142

[52] U.S. Cl. ................................ 356/109, 350/3.5
[51] Int. Cl. ............................ G01b 9/02, G02b
[58] Field of Search ........................ 356/106–113; 350/3.5; 95/36

[56] References Cited

UNITED STATES PATENTS

| 3,526,444 | 9/1970 | Carcel et al. | 350/3.5 |
| 2,425,929 | 8/1947 | Foster | 95/36 X |

OTHER PUBLICATIONS

Investigation of Hologram Techniques, Leith et al., Dec. 1965

*Primary Examiner*—Ronald L. Wibert
*Assistant Examiner*—Conrad Clark
*Attorney*—George E. Pearson

[57] ABSTRACT

Components of a holographic system are mounted for movement as a unit along a horizontal path of travel. Means for holding an object to be holographed, including a pair of trunnions having a pivotal axis parallel to said line of travel, are mounted for movement to and from the holographic system. By selectively moving the holographic system and the object holding means, and pivotally adjusting the object as necessary, the object can be holographically scanned quickly. Fixtures for curved objects can present both surfaces thereof for scanning. A fixture for flat or slightly curved objects is mounted for movement across the trunnion axis as well as pivoting thereabout.

6 Claims, 4 Drawing Figures

PATENTED JAN 16 1973

INVENTOR.
HUGH M. RUSH
MILAN E. GERARD

BY George E. Pearson
ATTORNEY

INVENTOR.
HUGH M. RUSH
MILAN E. GERARD
BY [signature]
ATTORNEY

INVENTOR.
HUGH M. RUSH
MILAN E. GERARD

BY George E. Pearson
ATTORNEY though extensive prior art exists on the subject of holography in the general field of nondestructive testing, nothing of a similar nature is known to exist with respect to the apparatus and system of this invention.

HOLOGRAPHIC TESTING APPARATUS

BACKGROUND OF THE INVENTION

The present invention relates to holographic analyzers and more particularly to a holographic nondestructive testing apparatus for inspecting aircraft structural sections.

Prior to the advent of the present invention, the technique of holographic structural analysis was confined to the research laboratory in the nondestructive testing of relatively small structural members. As the definition implies, the technique is based on holography which is a unique method of making a film record.

Holography is a unique method of making a film record of visual data relating to a three-dimensional object and recreating a three-dimensional image of the object therefrom. Instead of recording an image, as in conventional photography, the holographic process records interference patterns that result from the superposition of the coherent light generated by a laser, which light is reflected both from the object and from a reference source. The narrow beam of coherent light from the laser is made to pass through an assembly including a diverging lens and pin hole (spatial) filter for diverging the beam into a cone of light and removing "noise". The cone of light illuminates the object toe recorded and also falls upon a mirror which reflects light toward a photosensitive emulsion or film on a plate. This mirror-reflected light constitutes the reference beam. Light reflected from the object is also directed to fall on the film plate and constitutes an object beam. The reference and object beams reach the film plate at different angles so that where the waves in the two beams are in phase they reinforce one another and expose photosensitive gelatin of the plate at that point. Where the waves are out of phase they cancel each other and have no effect on the plate. Since no lens is used to focus the light reflected from the object, the film records, not an object, but the interference pattern resulting from the mixture of the two beams. After this exposure, the film plate is developed and the result is a hologram. When the hologram is illuminated by laser light similar to the reference beam, an observer, looking through the hologram as though it were a window, sees a reconstructed three-dimensional image of the original object.

A modification of the holographic arrangement just described employs a beam splitter to divide the laser beam into separately controllable object and reference beams. A lens-pin hole assembly in each beam then provides the correct degree of divergence and removes "noise". Holographic interferometry readily permits the monitoring of surface displacements of minute magnitude and can easily detect subsurface flaws in structural members by revealing the minute surface deflections that result from the application of low level stresses to the structure. These low level stresses can be applied either statically as by the application of vacuum, pressure or heat, or dynamically, as through the medium of a variable frequency ultrasonic transducer.

To produce a real-time image, a hologram is taken of the test object and developed before the object is deformed by stress applications. If the hologram is then viewed so that the reconstructed virtual image is superposed on the object, any stress due to deformation of the object will appear as a dynamic display of fringe patterns.

To produce a time-lapse hologram, an initial exposure is made but not developed. Then the object is slightly deformed, statically, and a second hologram is recorded on the same film. When developed and reconstructed, this doubly exposed hologram displays fringe patterns which are the result of interference between the first and second object beams representing the two positions of the object. These fringe patterns represent a highly accurate recording of the deformation of the test object and contains precise information about the displacement of the object from one position to the other. Surface regions above subsurface discontinuities are deformed differently than the rest of the surface as a result of the applied stress and hence produce anomalies in the fringe pattern.

Similarly, a time-average hologram is produced by exposing the object while it is undergoing dynamic vibrational stress. The reconstructed image displays a fringe pattern that accurately reveals the dynamic deformation of the test object.

SUMMARY OF THE INVENTION

In the modern world of today, larger, faster, costlier aircraft, flying higher and carrying more passengers than ever before, have increased demands for zero defects and 100 per cent reliability of their several structural components. Accordingly, the present invention is concerned with a method and means for applying holographic techniques in the aircraft and aerospace industry and contemplates an apparatus in which, once mounted, the test object is easily adjustable to readily position it for illumination with coherent light and holographically photographing of the illuminated area. The apparatus provides for rapid movement of its components which has the advantage of minimizing the time required to scan the test object compared to previous procedures which necessitated remounting the test object for complete holographing. Also, the apparatus has the capability of rapidly scanning large test objects as well as small ones. To this end, the test object is mounted between a pair of trunnions for pivoting about the axis thereof. The trunnions are mounted on a base for movement transversely of the trunnion axis. Holding fixtures having clamps or swivelly mounted suction cups serve to mount the object. An optical table mounted for movement along a path of travel parallel to the trunnion axis supports an optical system and photographic means movable as a unit. The several components are suitably powered and dimensioned to handle relatively large test objects for nondestructive testing or inspection thereof. Selective movement of the components serves to quickly scan the test object holographically.

DESCRIPTION OF EMBODIMENTS

Figure 1:
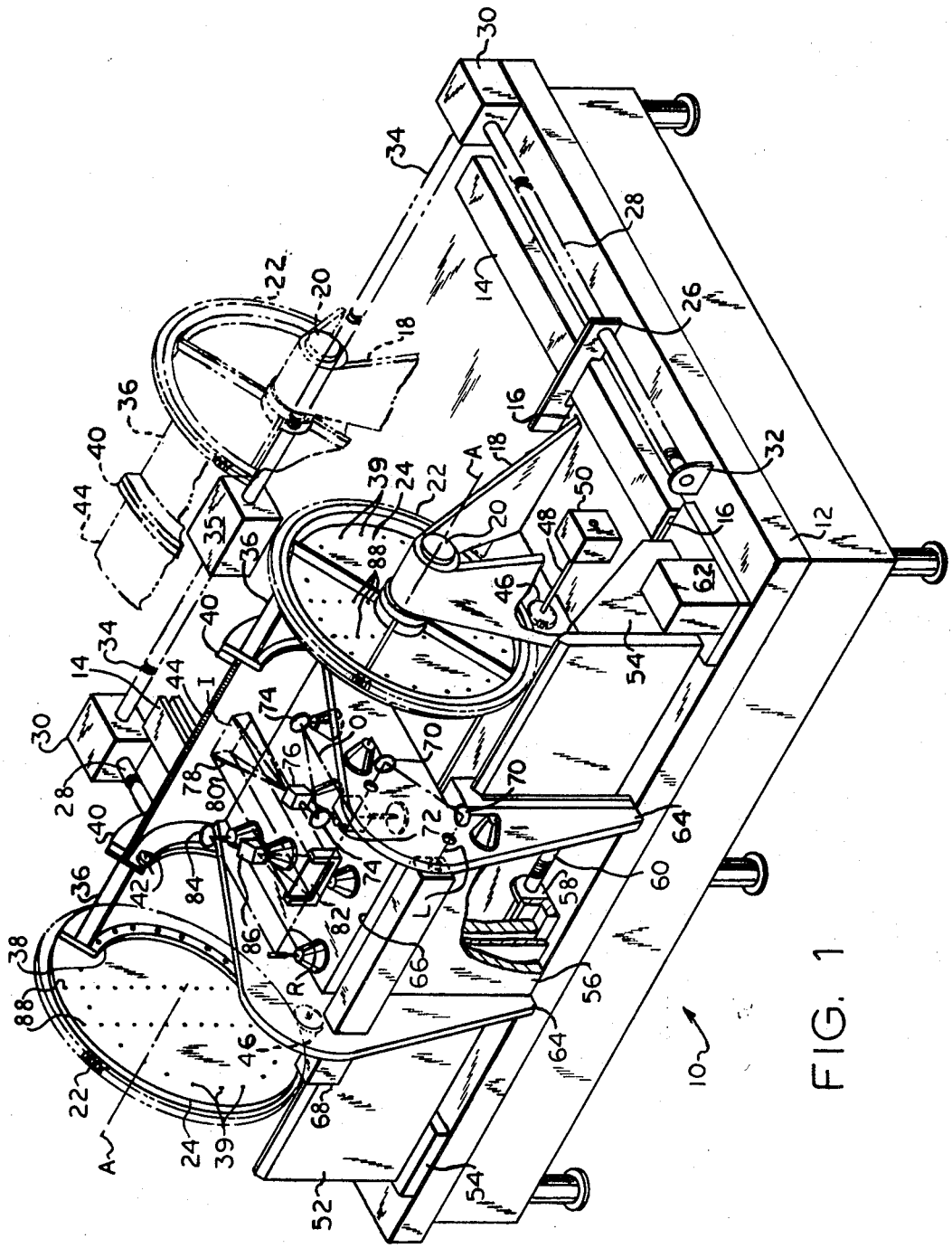
FIG. 1 is perspective view, with parts omitted or in section, of a device embodying the principles of the present invention which has means for holding curved test objects between a pair of slidably mounted trunnions, one of which is fragmentarily shown in dotted lines to illustrate rotation thereof to present the reverse side of the test object for inspection.

Referring to the drawings, there is shown in FIG. 1 an apparatus 10 embodying the principles of the present invention which includes a rectangular base or table 12. The base is air cushioned and self-leveling for isolating the apparatus from ambient vibration. Mounted atop the base are a pair of grooved guides 14 to which the ends of a support plate 16 are fitted for sliding movement.

Upstanding from one end of the support plate is a standard 18 in which a pivot shaft or trunnion 20 is journaled for rotation. Secured to the trunnion inwardly of the standard is a gear-toothed wheel 22 carrying a disk plate 24. A similar wheel 22 and plate 24 are likewise supported on the other end of the support plate 16 by a standard 18 and trunnion 20, not shown. The trunnions are aligned on an axis A and at least one of the standards is preferably adjustable along the plate 16 for mounting test objects of various lengths between the trunnions.

Secured to the ends of the support plate 16 are a pair of threaded drive members 26 (only one of which is seen in FIG. 1) in which helical screw rods 28 are received. The ends of the rods are journaled in gear boxes 30 and bearing mounts 32 suitably supported on the base. A drive shaft 34 has ends which are journaled in the gear boxes and so geared to the screw rods that rotation of the drive shaft turns the rods and causes movement of the trunnion standards 18. The drive shaft is adapted to be driven by an air motor or other suitable source of power 35.

Figure 2:
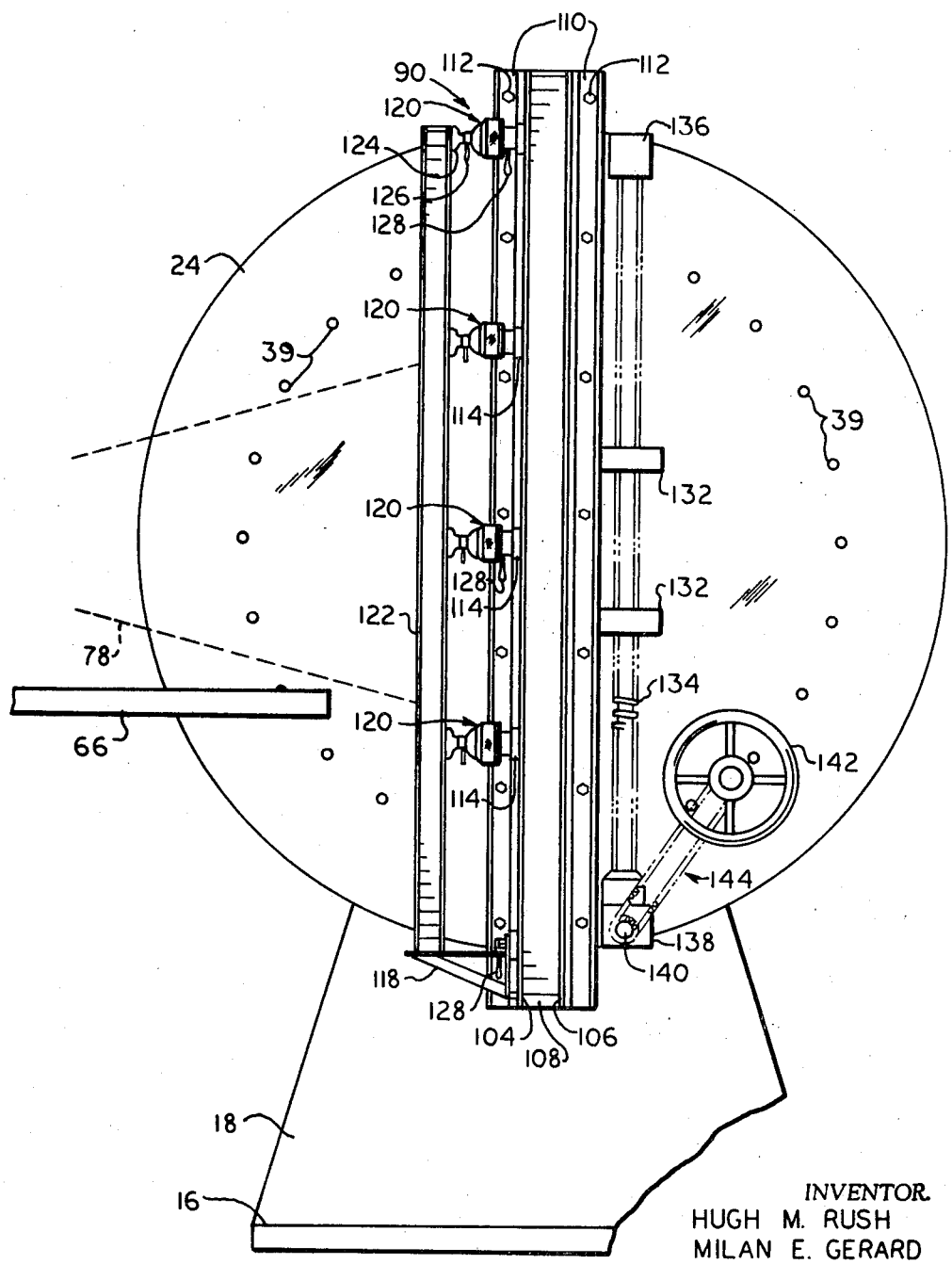
FIG. 2 is an enlarged vertical section view of a modified holding means for mounting flat or slightly curved test objects.

Attached to each of the disk plates 24 is an arcuate holding fixture 36, each of which has an attaching flange 38. The flange is adapted to be removably bolted to its disk plate utilizing bolt holes 39 therein, as shown in FIG. 2. The fixture is also provided with a supporting lip 40 and eccentric cam clamps 42 for holding therebetween the ends of a curved test object 44, such as an aircraft duct or other structural component.

Geared to the wheels 22 are a pair of pinions 46 secured to a drive shaft 48 mounted for rotation on the standards 18 and driven by an air motor 50, or the like. By appropriate rotation of the shaft 48, the fixtures 36 can be pivoted to present for inspection either the concave surface of the test object 44, as shown in full lines, or the convex surface thereof, as shown in dotted lines. Rotation of the shaft also provides for rapid scanning of the surfaces.

Positioned at right angles to the guides 14, and parallel to the axis A of the trunnions 20, is a vertically disposed bearing plate 52 mounted on the base 12 by brackets 54. Suitably journaled for sliding on the plate 52, along a horizontal line of travel, is a carriage 56. The carriage has a nut 58 which is operatively connected to a helical screw shaft 60 journaled in the brackets 54 and driven by an air motor 62, or the like. Rotation of the screw shaft serves to move the carriage along its line of travel.

Fixed to the carriage 56, and movable therewith, are a pair of right angular brackets 64 which support an optical table 66 and a laser beam generator 68. The generator produces a beam L of coherent light which is directed by mirrors 70 to a beam splitter 72 for splitting the beam L into an object beam O and a reference beam R.

Although the laser beam generator 68 is shown mounted directly on the carriage 56, it will be appreciated that the generator can be mounted otherwise so long as the first mirror 70 receives the beam L along the path shown in FIG. 1. The brackets 64 can be suitably perforated and additional reflecting mirrors employed, as necessary.

The object beam O is directed by mirrors 74 to a lens-pinhole spatial filter 76 which diverges the object beam into a cone 78 of coherent light for illuminating an area I on the test object 44. Preferably, the central ray of the cone of light is disposed substantially perpendicular to the illuminated area so that light is reflected therefrom along lines 80 onto a photographic means 82 including a photosensitive emulsion film or plate. The reference beam R is directed by mirrors 84 to a lens-pinhole spatial filter 86 which diverges the beam onto the photographic means 82.

It is to be noted that the photographic means 82, and the optical system made up of the mirrors 70, 74, 84 and filters 76, 86, are all mounted on the optical table 66 and therefore move as a unit for scanning the test object along a transverse horizontal path of travel. By turning the trunnions 20, the test object can be moved about the trunnion axis A transversely thereof and of such path of travel for presenting other portions of the test object for scanning. Also, the trunnions can be moved to and from the optical table for proper illumination of the test object or for presenting the other side thereof. Suitable safety devices, not shown, can be provided for appropriately deenergizing the motors when the components driven thereby reach their limits of travel.

OPERATION

The operation of the inspection or testing apparatus of the present invention is believed to be clearly apparent and is briefly summarized at this point. With the several components of the apparatus 10 appropriately adjusted, real-time, time-lapse or time-average holograms, as hereinbefore described, are taken of a starting area on the test object 44. The holographic images thereof can be viewed for locating any defects. The components are then moved to illuminate an adjacent area which is then holographed, the areas overlapping slightly. This procedure is continued until the test object, or desired portion thereof, has been completely holographed. The trunnions 20 can be adjusted for holographically scanning the reverse side of the test object. Thus, without remounting the test object, it can be tested relatively rapidly and checks can be made for a variety of defects at each setting of the components. Also, the test results can be viewed in real time, and a permanent record is made of the tests which is readily available.

MODIFIED HOLDING FIXTURE

In the case of flat or slightly curved test objects, the arcuate holding fixtures 36 are replaced. Accordingly, the disk plates 24 are provided with perforations 88 for the reception of bolts, not shown, therethrough. Inviting attention to FIGS. 2 and 3, there is shown a holding fixture 90 which is slidable mounted on a pair of guide plates 92 having tapped holes 93 adapted to receive bolts, not shown, passing through the perforations 88 in the disk plates. Each plate 92 has parallel, wedge-shaped edges 94, one of which is disposed in a mating groove 96 formed in an elongate support members 98. The other edge is slidingly engaged by a plurality of slanting edge retaining blocks 100 secured to the member for holding the respective member and plate together while permitting relative sliding movement therebetween.

Disposed between the members 98 is a substantially rigid light weight, structure 102. The structure is composed of a face plate 104 and a back plate 106 joined together by an aluminum cellular wall 108. Secured to the side edges of the structure, fore and aft, are angle members 110 which are attached to the support members 98 by bolts 112.

Bonded or otherwise secured to the face plate 104 are a plurality of attaching bosses 114, each having a tapped hole 116. The bosses are adapted to have attached thereto devices 118 and 120 for mounting a test object 122, such as a honeycomb panel or other structural part of an aircraft, as shown in FIG. 2. The devices 118 are angle brackets bolted to a pair of the bosses for supporting the major portion of the weight of the test object, whereas the devices 120 have suction cups 124 each of which is provided with a hose 126 connected to a source of vacuum, not shown.

Figure 3:
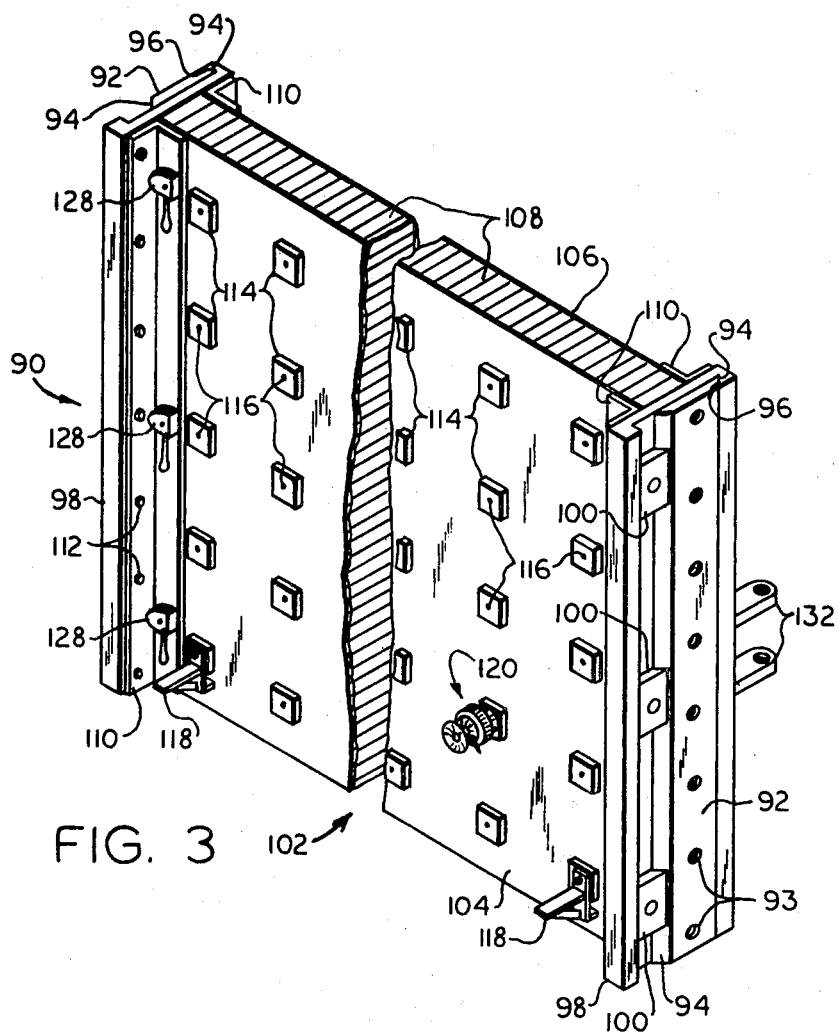
FIG. 3 is a fragmentary perspective view of the holding means of FIG. 2 with parts broken away or omitted.

Alternatively, the test object 122 can be mounted on the structure 102 using eccentric cam clamps 128 supported on the angle members 110 secured to the face plate 104, better seen in FIG. 3.

Figure 4:
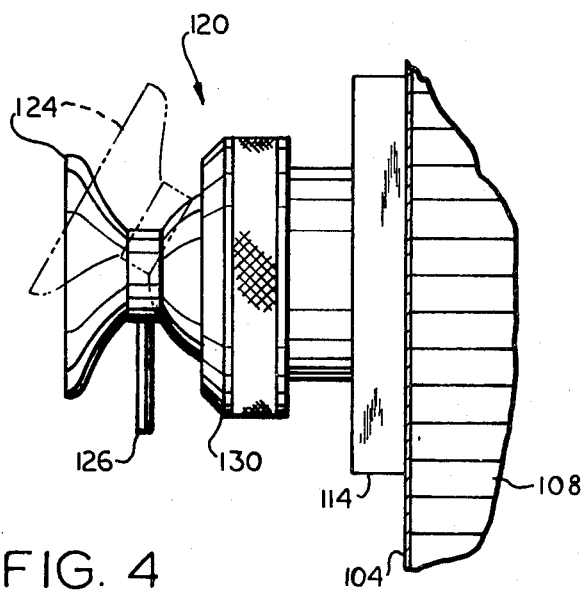
FIG. 4 is an enlarged fragmentary side view illustrating one of the suction devices of the holding means of FIG. 2.

Although the test object 122 has been illustrated as a flat panel, the devices 118 and 120 can also mount a test object, not shown, which is slightly curved. To accommodate the curvature of such a test object, the suction cups 124 are mounted for swivelling, as shown in FIG. 4. For this purpose, each device 120 is provided with a conventional ball and socket arrangement designated generally by reference numeral 130. Each suction cup can thus be disposed with the central axis thereof substantially perpendicular to the test object surface area engaged thereby for assuring a secure hold thereon.

Returning to FIGS. 2 and 3, each of the support members 98 has fixed thereto a pair of spaced nuts 132 to which a helical screw rods 134 is operatively connected. The upper ends of the rods are received in bearing blocks 136 fixed to the disk plates 124, respectively. The lower ends of the rods are supported on gear boxes 138 fixed to the respective disk plates and are geared to a transverse drive shaft 140, the ends of which are supported in the gear boxes. The driveshaft is adapted to be alternatively rotated by a hand wheel 142 through a sprocket and chain arrangement 144 or by an air motor or the like, not shown. The test object can thus be moved across the trunnion axis A as well as pivoted thereabout.

OPERATION

The operation of the modified holding fixture of the present invention is believed to be clearly apparent and is briefly summarized at this point. The standards 18 are positioned a distance from the optical table 66 to assure that the light cone 78 illuminates the test object 122 with the proper intensity of light for the desired hologram. If necessary, the test object is pivoted about the trunnion axis A so that the central ray of the light cone is perpendicular to the test object area illuminated thereby, or substantially perpendicular thereto in the case of a test object with a curved surface. The test object can be scanned horizontally by moving the optical table, or vertically by sliding the structure 102 relative to the guide plates 92, with pivotal and/or distance adjustment, as necessary, in the case of a curved test object. The appropriate combination of horizontal and vertical scanning is carried out for holographing the test object.

There has thus been provided a holographic apparatus which has been adapted to the aircraft and aerospace industry for nondestructively inspecting or testing an object which, once mounted, can be readily positioned for relatively rapid scanning of the test object and thereby minimizing test time. The device can handle fairly large test objects and even present the reverse side thereof for scanning in certain instances.

Although the present invention has been herein shown and described in what are believed to be the most practical and preferred embodiments thereof, it will be understood by those skilled in the art that various changes and modifications can be made in the practice of the invention without being limited to the details disclosed herein.

What is claimed as new and useful and desired to be secured by U. S. Letters Patent is:

1. Production type holographic testing mechanism comprising
   a vibration isolation base,
   a holographic system mounted on the base for controlled movement along a selected path,
   a pair of object supports mounted on the base, separated in the direction of such path, and in spaced relation to such path,
   means on said object supports for supporting therebetween an object having a surface thereof to be tested parallel to such path, and facing the holographic system,
   controlled means for moving the holographic system toward and away from such object when so supported, and
   means for adjusting the object supports with such object so supported, thereby, to position each of a plurality of selected portions of such surface facing the holographic system in position to produce a succession of holographs along each such selected portion.

2. Production type holographic testing mechanism as claimed in claim 1 wherein the surface to be tested is flat.

3. Production type holographic testing mechanism as claimed in claim 2 wherein both of two opposite aides of an object to be tested are flat and the means supporting such object is reversible, thereby selectively to expose either of such sides of such object to the holographic system.

4. Production type holographic testing mechanism as defined in claim 2 wherein the object support comprises a pair of track means mounted one on each object support perpendicular to the trunnion axis, means for mounting a flat object on said track means for movement therealong, means for adjusting the track means to parallel position defining a plane parallel to the trunnion axis, and means for releasably securing such flat object to said mounting means for movement of such object to each of a plurality of selected positions along said track means to produce such succession of holographs as the holographic system is moved along such path with the object in each selected position.

5. Production type holographic testing mechanism for testing an object having a surface of simple curvature, and comprising a vibration isolation base, a holographic system mounted on the base for controlled movement along a selected path, a pair of trunnioned object supports mounted on the base separated in the direction of such path and in spaced relation to such path for rotative adjustment about a common trunnion axis parallel to such path, means on each of said object supports for supporting therebetween an object having a surface of simple curvature about an axis parallel to the trunnion axis, and facing the holographic system, controlled means for moving the trunnion axis and the holographic system toward and away from each other, and means for synchronously adjusting the rotative position of the object supports about the trunnion axis to successively position each of a plurality of selected portions of such surface facing the holographic system in position to produce a succession of holographs along each such selected portion of such surface upon movement of the holographic system along such path.

6. Production type holographic testing mechanism for testing a surface of an object supported thereon, and comprising a vibration isolation base, a table mounted on said base for movement to adjusted position along a straight path, a holographic system mounted on the base for traversing movement along a straight path normal to the path of table movement, a pair of object supports mounted in said table in spaced apart relation in a direction parallel to the path of movement of the holographic system to receive and support therebetween an object to be tested, and with a surface on such object facing the holographic system and parallel to the path of traversing movement of the holographic system, and means for adjusting said object supports to each of a plurality of selected positions transversely of the path of movement of the holographic system to produce a succession of holographs at selected intervals along a portion of such surface with the object supports in each such selected position.

* * * * *